United States Patent Office 3,244,725
Patented Apr. 5, 1966

3,244,725
4,5-DIACYL-3-HYDROXY-3-PYRROLIN-2-ONES
William Taub, 43 Ben-Zion St., Rehovoth, Israel, and Sander Vromen, 5 Vitkin St., Haifa, Israel
No Drawing. Filed Sept. 21, 1964, Ser. No. 398,042
6 Claims. (Cl. 260—326.5)

This invention relates to new organic compounds having useful pharmacodynamic activity. More specifically, these 4,5-diacyl-3-hydroxy-3-pyrrolin-2-one derivatives have anti-phlogistic, antipyretic and anti-inflammatory activity. These compounds also have utility as intermediates for preparing related compounds having like activities.

The compounds of this invention are illustrated by the following formula:

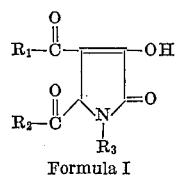

Formula I in which $R_1$, $R_2$ and $R_3$ are, respectively, alkyl of a maximum of 12 carbon atoms, cyclo alkyl of from 3–6 carbon atoms, phenyl, naphthyl, benzyl and, except for $R_3$, lower alkoxy of a maximum of 8 carbon atoms or benzyloxy. The compounds in which $R_1$, $R_2$ and $R_3$ are lower or cyclo alkyl are preferred.

The compounds of this invention are prepared by a novel condensation of known and easily prepared starting materials, namely a primary amine ($R_3NH_2$), a glyoxal ($R_2COCHO$) and an acyl pyruvic acid ester ($R_1COCH_2COCOOEt$).

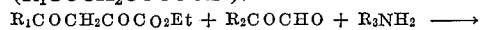

$R_1COCH_2COCO_2Et + R_2COCHO + R_3NH_2 \longrightarrow$

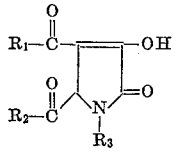

The three starting materials are condensed by reaction at moderate temperatures such as from room temperature up to the reflux temperature of the reaction mixture. An inert organic solvent in which the reactants are substantially soluble is usually used such as ethanol, methanol or isopropanol. Preferably the substituted glyoxal is reacted with the amine then in turn with the lower alkyl acyl pyruvate. The desired product either crystallizes from the mixture or is isolated by standard procedures.

The bisacyl-α-keto lactams of this invention are sufficiently acid to form salts with various organic or inorganic bases. The alkali metal salts are preferred such as the potassium or sodium salts. Other pharmaceutically acceptable salts with nontoxic cations may be prepared by methods known to those skilled in the art. Also, ester or ether derivatives at this grouping may be prepared as desired.

Also variations of the compounds represented by Formula I may be made as known to those skilled in the medicinal art, for example, using thiophene or furan for $R_1$ or $R_2$, substituting "inert" substituents on the aryl rings such as halo, lower alkoxy, trifluoromethyl, etc. Such obvious modifications are considered a part of this invention.

The terms lower alkyl or lower alkoxy are used to define terms of a carbon content of 1–8 preferably 1–2.

The following examples are designed to teach the preparation of representative compounds of this invention.

EXAMPLE 1

*Glyoxal*

The methyl ketone (0.5 mole) is added dropwise to 0.5 mole of selenium dioxide suspended in 300 ml. of dioxane containing 1% of water while stirring and heating at reflux for from 2–6 hours. The clear solution is filtered hot and the residue from the filtrate fractionally distilled.

*Acylpyruvate esters*

Sodium metal (12.5 g.) is reacted with 280 ml. of absolute ethanol. The mixture is cooled to about 0° C. while diethyloxalate (0.5 mole) is added dropwise. The desired methyl ketone ($R_1COCH_3$) is then added dropwise. The condensation product is removed by filtration and isolated as either the sodium salt or preferably the free ester obtained by neutralizing an aqueous solution of the salt and extraction with ether.

EXAMPLE 2

*Diacylpyrrolinones*

A mixture of 5 ml. of absolute ethanol and 0.001 mole of amine ($R_3NH_2$) is stirred while 0.001 mole of the glyoxal is added ($R_2COCHO$) at room temperature. Then 0.001 mole of the lower alkyl acylpyruvate

($R_1COCH_2COCO_2R$)

in 25 ml. of absolute ethanol is added dropwise. The mixture is heated at reflux for 10–60 minutes. The stirring is continued until the mixture cools to room temperature. The whole reaction mixture is left in a cold place to crystallize the desired pyrrolinone. If no crystallization takes place, the solvent is removed and the residue purified by trituration with various solvents (such as carbon tetrachloride, chloroform, etc.) or by distillation under high vacuum.

Using this method the following compounds are prepared.

| No. | $R_1$ | $R_2$ | $R_3$ | M.P. | I.R. (cm.⁻¹) |
|---|---|---|---|---|---|
| 1 | α-Naphthyl | Cyclopropyl | n-Butyl | 154–5 | |
| 2 | ---do--- | t-Butyl | ---do--- | Oil | 1,660, 1,690 |
| 3 | Cyclopentyl | Cyclopropyl | ---do--- | 214–5 | |
| 4 | Cyclopropyl | ---do--- | ---do--- | 181–3 | |
| 5 | CH₃CH₂OCOCH=CH— | Iso-Butyl | ---do--- | 198–9 | |
| 6 | Phenyl | Cyclopropyl | ---do--- | 235–6 | |
| 7 | t-Butyl | ---do--- | ---do--- | Oil | 1,020, 1,720 |
| 8 | Cyclopropyl | Phenyl | ---do--- | 183–6 | |
| 9 | ---do--- | C₆H₅—CH₂O— | Cyclohexyl | Oil | 1,680, 1,745 |
| 10 | Phenyl | Phenyl | ---do--- | 131–3 | |
| 11 | ---do--- | ---do--- | n-Dodecyl | Oil | 1,690, 1,760 |
| 12 | ---do--- | Cyclopropyl | n-Hexyl | Oil | 1,720, 1,760 |
| 13 | ---do--- | Cyclohexyl | Cyclohexyl | 129–131 | |
| 14 | t-Butyl | Phenyl | ---do--- | 130–132 | |
| 15 | ---do--- | ---do--- | n-Hexyl | Oil | 1,720, 1,770 |
| 16 | ---do--- | Cyclohexyl | Cyclohexyl | Oil | 1,740, 1,780 |
| 17 | ---do--- | Cyclopropyl | Phenyl | Oil | 1,710, 1,740 |
| 18 | Phenyl | Phenyl | n-Hexyl | Oil | 1,680, 1,740 |
| 19 | Methoxy | Butyl | Ethyl | | |
| 20 | Benzyl | ---do--- | ---do--- | | |
| 21 | Allyl | ---do--- | Butyl | | |

An aliquot of a compound described above in methanol is treated with one equivalent of sodium or potassium methylate in methanol. The mixture is then evaporated to dryness to give the desired alkali metal salt.

What is claimed is:

1. The compound of the formula:

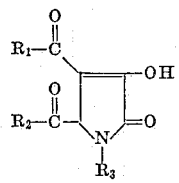

in which $R_1$ and $R_2$ are members selected from the group consisting of alkyl of 1–6 carbon atoms, cycloalkyl of 3–6 carbon atoms, phenyl, naphthyl, benzyl, benzyloxy and, except for $R_2$, alkoxy of 1–2 carbon atoms and $R_3$ is a member selected from the group consisting of alkyl of 1–12 carbon atoms, cycloalkyl of 3–6 carbon atoms, naphthyl and benzyl.

2. The compound of the formula:

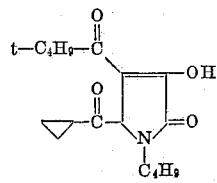

3. The compound of the formula:

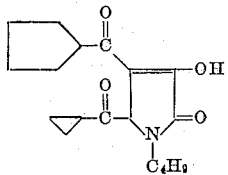

4. The compound of the formula:

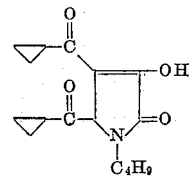

5. The compound of the formula:

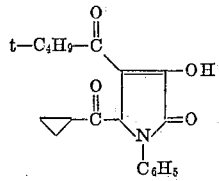

6. The method of preparing compounds having the formula:

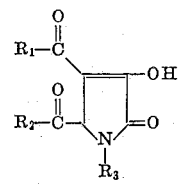

in which $R_1$ and $R_2$ are members selected from the group consisting of alkyl of 1–6 carbon atoms, cyclo alkyl of 3–6 carbon atoms, phenyl, naphthyl, benzyl, benzyloxy and, except for $R_2$, alkoxy of 1–2 carbon atoms and $R_3$ is a member selected from the group consisting of alkyl of 1–12 carbon atoms, cyclo alkyl of 3–6 carbon atoms, naphthyl and benzyl; comprising reacting by condensation $R_1COCH_2COCO_2Et$, $R_2COCHO$ and $R_3NH_2$ in which $R_1$, $R_2$ and $R_3$ are as previously defined.

No references cited.

HENRY R. JILES, *Primary Examiner.*

J. A. NARCAVAGE, *Assistant Examiner.*